US012025021B2

(12) United States Patent
Pschirer et al.

(10) Patent No.: US 12,025,021 B2
(45) Date of Patent: Jul. 2, 2024

(54) SYSTEM AND METHOD FOR RESTRAINING HEAT EXCHANGER WITH CABLE IN TENSION

(71) Applicant: General Electric Company, Schenectady, NY (US)

(72) Inventors: James D. Pschirer, Enfield, CT (US); Dimitrios V. Doupis, Avon, CT (US); Steven Kurdziel, Rocky Hill, CT (US)

(73) Assignee: GE INFRASTRUCTURE TECHNOLOGY LLC, Greenville, SC (US)

( * ) Notice: Subject to any disclaimer, the term of this patent is extended or adjusted under 35 U.S.C. 154(b) by 0 days.

(21) Appl. No.: 18/216,581

(22) Filed: Jun. 29, 2023

(65) Prior Publication Data
US 2023/0340894 A1   Oct. 26, 2023

Related U.S. Application Data

(63) Continuation of application No. 17/556,876, filed on Dec. 20, 2021, now Pat. No. 11,828,189.

(51) Int. Cl.
*F01D 25/28* (2006.01)
*F01D 25/12* (2006.01)
*F01K 23/10* (2006.01)

(52) U.S. Cl.
CPC ............. *F01D 25/28* (2013.01); *F01D 25/12* (2013.01); *F01K 23/10* (2013.01);
(Continued)

(58) Field of Classification Search
CPC .......... F01D 25/28; F01D 25/12; F01K 23/10; F05D 2220/72; F05D 2260/213;
(Continued)

(56) References Cited

U.S. PATENT DOCUMENTS 1,757,343 A    5/1930  Steinmuller
1,780,477 A *  11/1930 Grace ....................... F28B 1/02
                                                  165/83

(Continued)

FOREIGN PATENT DOCUMENTS

CN    1324197 C    7/2007
FR    2944583 A1   10/2010
(Continued)

OTHER PUBLICATIONS

European Extended Search Report for EP Application No. 22210442.4, dated May 11, 2023, 5 pgs.

*Primary Examiner* — Jesse S Bogue
(74) *Attorney, Agent, or Firm* — Fletcher Yoder, P.C.

(57) ABSTRACT

A system includes a retention system configured to support a heat exchanger along a flow path within a duct. The retention system includes a first sleeve configured to extend between opposite first and second walls of the duct, a first cable extending through the first sleeve, and a first bumper coupled to the first sleeve. The first bumper is configured to contact the heat exchanger. The retention system includes a first tensioner coupled to the first cable, wherein the first tensioner is configured to provide a first tension in the first cable. The first tension is adjustable to detune the natural frequency of the heat exchanger away from any excitation load frequencies caused by an exhaust gas flow through the duct.

17 Claims, 5 Drawing Sheets

(52) U.S. Cl.
CPC .... *F05D 2220/72* (2013.01); *F05D 2260/213* (2013.01); *F05D 2260/38* (2013.01)

(58) Field of Classification Search
CPC ...... F05D 2260/38; Y02E 20/16; F22B 37/20; F22B 37/24; F22B 37/244; F28D 21/001; F28D 2021/0024; F28F 9/013
See application file for complete search history.

(56) References Cited

U.S. PATENT DOCUMENTS

| | | | |
|---|---|---|---|
| 2,016,164 A * | 10/1935 | Williams | F28D 1/03 |
| | | | 165/151 |
| 2,876,975 A | 3/1959 | Short | |
| 3,814,063 A | 6/1974 | Bijmholt | |
| 3,910,542 A * | 10/1975 | Bridgnell | F16F 15/06 |
| | | | 165/69 |
| 4,236,574 A | 12/1980 | Bosne | |
| 4,377,025 A | 3/1983 | Masai et al. | |
| 4,697,633 A * | 10/1987 | Darragh | F28D 9/00 |
| | | | 165/166 |
| 5,016,706 A * | 5/1991 | Dimarco | F28F 9/0137 |
| | | | 165/DIG. 426 |
| 6,892,797 B2 * | 5/2005 | Beddome | F28D 9/0043 |
| | | | 165/145 |
| 6,975,841 B2 | 12/2005 | Uriu et al. | |
| 7,279,543 B2 * | 10/2007 | Irikura | C08G 73/1039 |
| | | | 528/331 |
| 7,325,594 B2 | 2/2008 | Wilhelm et al. | |
| 7,357,100 B2 | 4/2008 | Waseda et al. | |
| 10,590,807 B2 | 3/2020 | Arnold et al. | |
| 11,047,266 B2 | 6/2021 | Bairley et al. | |
| 2008/0180491 A1 | 7/2008 | Sugahara | |
| 2008/0250746 A1 | 10/2008 | Nawrotski | |
| 2010/0018688 A1 | 1/2010 | Klarner et al. | |
| 2011/0226780 A1 | 9/2011 | Bell et al. | |
| 2012/0279596 A1 | 11/2012 | Kramer et al. | |
| 2013/0340971 A1 | 12/2013 | Nishioka et al. | |
| 2014/0260322 A1 | 9/2014 | Tanaka et al. | |
| 2015/0219332 A1 * | 8/2015 | Nakamori | G21D 1/006 |
| | | | 165/69 |
| 2016/0305650 A1 | 10/2016 | Magee et al. | |
| 2021/0404752 A1 | 12/2021 | Guymon et al. | |

FOREIGN PATENT DOCUMENTS

| | | |
|---|---|---|
| JP | 2014142104 A | 8/2014 |
| WO | 2019138667 A1 | 7/2019 |

\* cited by examiner

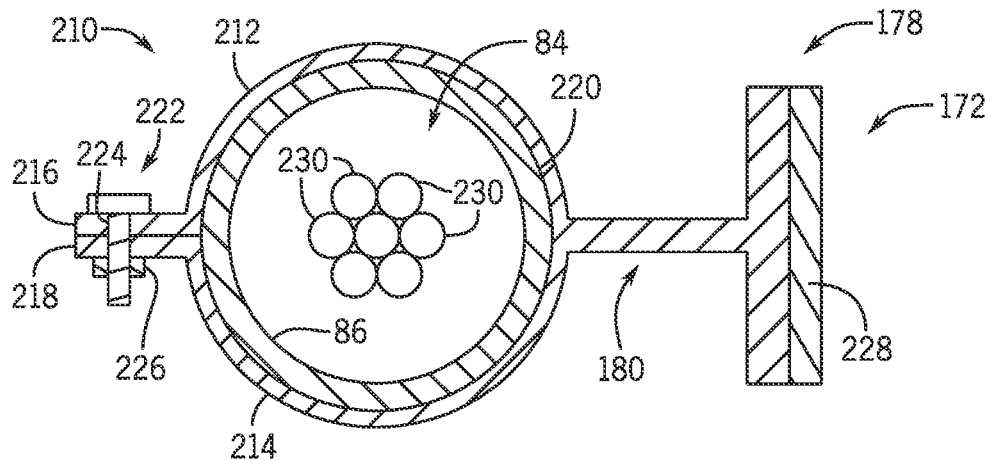
FIG. 3
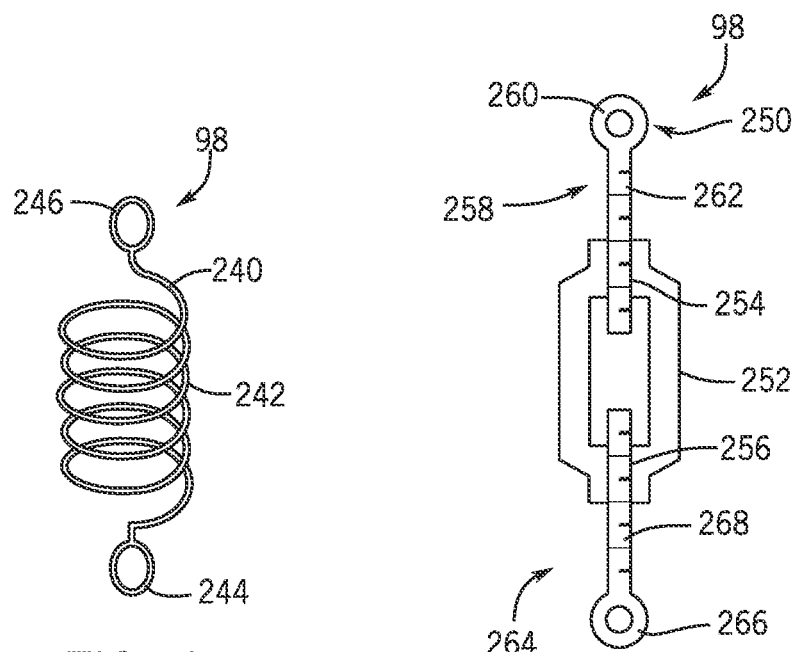
FIG. 4
FIG. 5

SYSTEM AND METHOD FOR RESTRAINING HEAT EXCHANGER WITH CABLE IN TENSION

CROSS-REFERENCE TO RELATED APPLICATIONS

This application is a continuation of U.S. patent application Ser. No. 17/556,876, entitled "SYSTEM AND METHOD FOR RESTRAINING HEAT EXCHANGER WITH CABLE IN TENSION," filed Dec. 20, 2021, which is herein incorporated by reference in its entirety for all purposes.

BACKGROUND

The subject matter disclosed herein relates to a gas turbine system and, more particularly, to systems for restraining heat exchangers along a flow path.

A gas turbine system may use one or more heat exchangers to transfer heat between different fluids. For example, the gas turbine system may discharge an exhaust gas flow into a heat recovery steam generator (HRSG), which includes one or more heat exchangers configured to transfer heat from the exhaust gas flow to generate steam. Unfortunately, the exhaust gas flow may apply an oscillating force on the heat exchangers due to oscillations in the exhaust gas flow, thereby causing vibration of the heat exchangers (i.e., a vibratory load). If a frequency of the oscillating force (i.e., an excitation load frequency) is equal to or close to a natural frequency of the heat exchangers, then resonance can occur in the heat exchangers. In turn, the resonance may increase an amplitude of the vibration to unacceptable levels, potentially causing mechanical wear or damage. Accordingly, a need exists for restraining the heat exchangers in a manner adding stiffness to the heat exchangers and detuning the natural frequency of the heat exchangers away from the excitation load frequencies caused by the exhaust gas flow.

BRIEF DESCRIPTION

Certain embodiments commensurate in scope with the originally claimed subject matter are summarized below. These embodiments are not intended to limit the scope of the claimed subject matter, but rather these embodiments are intended only to provide a brief summary of possible forms of the subject matter. Indeed, the subject matter may encompass a variety of forms that may be similar to or different from the embodiments set forth below.

In certain embodiments, a system includes a retention system configured to support a heat exchanger along a flow path within a duct. The retention system includes a first sleeve configured to extend between opposite first and second walls of the duct, a first cable extending through the first sleeve, and a first bumper coupled to the first sleeve. The first bumper is configured to contact the heat exchanger. The retention system includes a first tensioner coupled to the first cable, wherein the first tensioner is configured to provide a first tension in the first cable.

In certain embodiments, a method includes supporting a heat exchanger along a flow path within a duct via a retention system. The retention system includes a first sleeve configured to extend between opposite first and second walls of the duct, a first cable extending through the first sleeve, and a first bumper coupled to the first sleeve. The first bumper is configured to contact the heat exchanger. The method includes providing a first tension in the first cable via a first tensioner coupled to the first cable.

In certain embodiments, a heat recovery steam generator includes a heat exchanger disposed in a duct; and a retention system configured to support the heat exchanger along a flow path within the duct. The retention system includes first and second sleeves configured to extend between opposite first and second walls of the duct, first and second cables extending through the first and second sleeves, respectively, and first and second bumpers coupled to the first and second sleeves, respectively. The first bumper is configured to contact an upstream side of the heat exchanger, and the second bumper is configured to contact a downstream side of the heat exchanger. The system includes a tension system coupled to the first and second cables, wherein the tension system comprises a plurality of tensioners configured to provide a first tension in the first cable and a second tension in the second cable. The first and second tensions are configured to adjust a stiffness of the retention system and to adjust a natural frequency of the heat exchanger away from an excitation load frequency.

BRIEF DESCRIPTION OF THE DRAWINGS

These and other features, aspects, and advantages of the present disclosure will become better understood when the following detailed description is read with reference to the accompanying drawings in which like characters represent like parts throughout the drawings, wherein:

FIG. 3 is a cross-sectional view of a bumper coupled to a sleeve of the restraint system of FIGS. 1 and 2;

FIG. 4 is a schematic of an embodiment of a tensioner of the restraint system of FIGS. 1-3, illustrating a spring tensioner having a helical spring;

FIG. 5 is a schematic of an embodiment of a tensioner of the restraint system of FIGS. 1-3, illustrating a turnbuckle;

DETAILED DESCRIPTION

One or more specific embodiments of the present disclosure will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," "the," and "said" are intended to mean that there are one or more of the elements. The terms "comprising," "including," and "having" are intended to be inclusive and mean that there may be additional elements other than the listed elements.

In a variety of applications, one or more heat exchangers may be disposed along a fluid flow path (e.g., an exhaust flow path), such that a fluid flow passes through and/or around the heat exchangers to facilitate heat transfer. Unfortunately, the fluid flow also may subject the heat exchangers to potential vibration due to oscillations in the fluid flow. The disclosed embodiments include a restraint system configured to help retain a position of the heat exchangers along the fluid flow path, while also helping to reduce the possibility of resonance in the heat exchangers. For example, if the fluid flow applies an oscillating force on the heat exchangers, then resonance can occur when a frequency of the oscillating force (i.e., an excitation load frequency) is equal to or close to a natural frequency of the heat exchangers. Accordingly, as discussed in detail below, the restraint system includes a stiffening system and/or vibration damping system having a cable and sleeve assembly and a tensioning assembly, which is configured to enable adjustments to the stiffness of the restraint system and to detune the natural frequencies of the heat exchangers away from the frequency of the oscillating force associated with the fluid flow. The tensioning assembly may include one or more types of tensioners used alone or in combination with one another to vary a tension of cables in the cable and sleeve assembly. Examples of the tensioners may include springs, turnbuckles, fluid-driven tensioners (e.g., piston-cylinder assemblies), electric-driven tensioners, manual tensioners, counter-weight tensioners, or any combination thereof.

Figure 1:
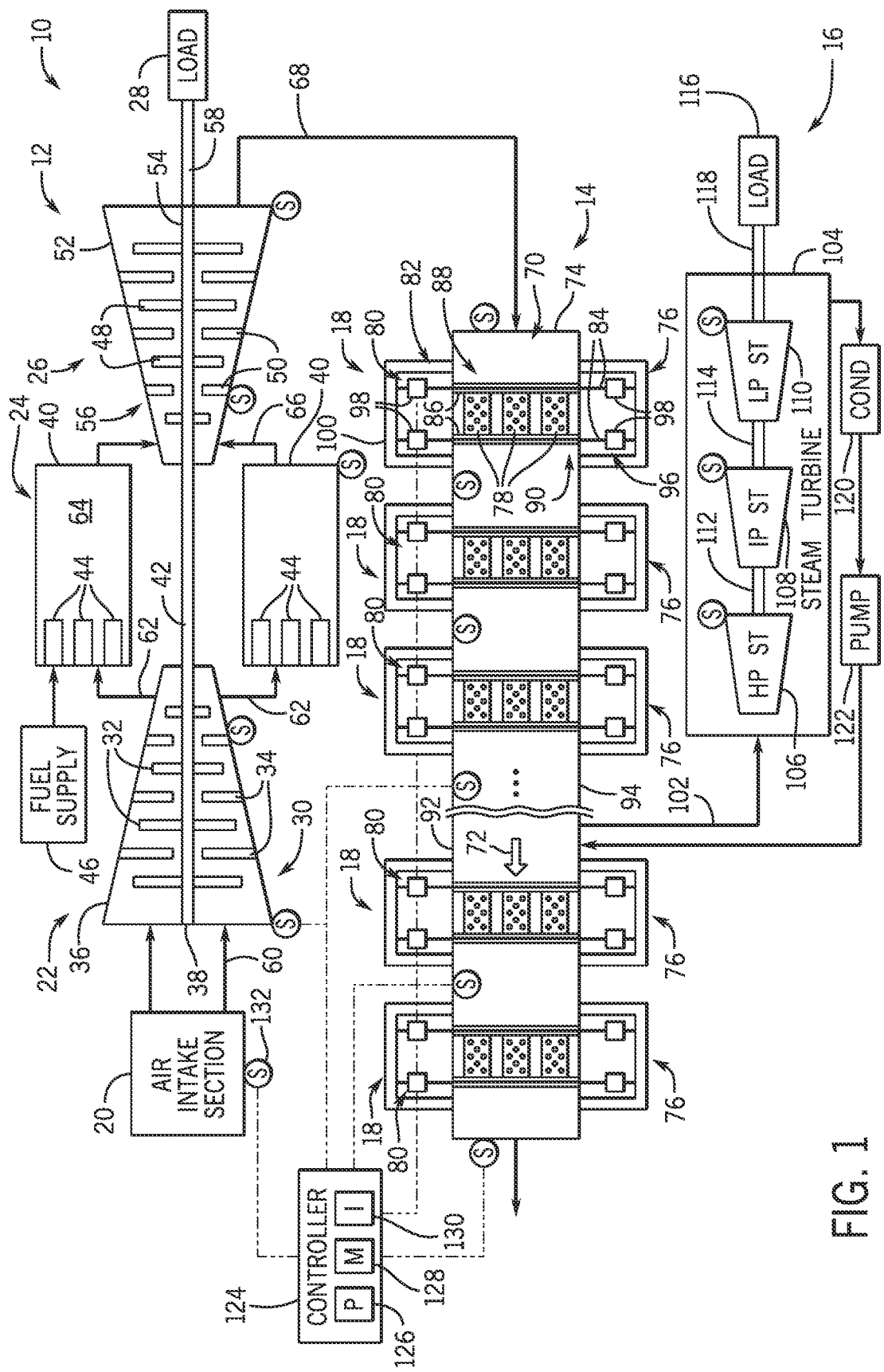
FIG. 1 is a schematic view of an embodiment of a system having a gas turbine system, a heat recovery steam generator (HRSG), a steam turbine system, and a restraint system configured to provide restraint for various modules in the HRSG.

FIG. 1 is a schematic of an embodiment of a system 10 having a gas turbine system 12, a heat recovery steam generator (HRSG) 14, a steam turbine system 16, and a restraint system 18 configured to provide restraint and vibration damping for various components or modules in the HRSG 14. The vibration damping features of the restraint system 18 are adjustable, such that the restraint system 18 can be tailored to the operating characteristics of the HRSG 14 to reduce the possibility of resonance in the HRSG 14. For example, the HRSG 14 may be subject to different frequencies of vibration depending on the operating conditions of the gas turbine system 12. Accordingly, the restraint system 18 can adjust a stiffness of the restraint of the components or modules in the HRSG 14, such that a natural frequency of the components or modules can be changed to reduce the possibility of resonance during the various operating conditions. The specific features and operating characteristics of the restraint system 18 are discussed in further detail below.

As illustrated, the gas turbine system 12 includes an air intake section 20, a compressor section 22, a combustor section 24, a turbine section 26, and a load 28, such as an electrical generator. The air intake section 20 may include one or more air filters, anti-icing systems, fluid injection systems (e.g., temperature control fluids), silencer baffles, or any combination thereof. The compressor section 22 includes a plurality of stages 30 of compressor blades 32 (e.g., rotatable blades) and compressor vanes 34 (e.g., stationary vanes) disposed within a compressor casing 36. In particular, the compressor blades 32 are coupled to a compressor shaft 38 and extend radially outward from the shaft 38 toward the compressor casing 36, while the compressor vanes 34 are coupled to the compressor casing 36 and extend radially inward toward the shaft 38. Each of the compressor stages 30 may include a plurality of the compressor blades 32 arranged circumferentially about the shaft 38 and a plurality of the compressor vanes 34 arranged circumferentially about the compressor casing 36. The illustrated compressor section 22 may include between 1 and 28 stages 30 of the compressor blades 32 and the compressor vanes 34.

The combustor section 24 includes one or more combustors 40, such as a single annular combustor disposed about a shaft 42 between the compressor section 22 and the turbine section 26, or a plurality of circumferentially spaced combustors 40 disposed about the shaft 42. The one or more combustors 40 may include one or more fuel nozzles 44, such as a central fuel nozzle and a plurality of peripheral fuel nozzles (e.g., 2, 3, 4, 5, 6, or more peripheral fuel nozzles disposed about the central fuel nozzle). The combustor section 24 also may be coupled to one or more fuel supplies 46, such as a liquid fuel supply and/or a gas fuel supply. The fuel supplies 46 may include one or more fuel circuits, such as a primary fuel circuit and a secondary fuel circuit, coupled to the fuel nozzles 44. The fuel supplies 46 may include fuel sources, such as, but not limited to, natural gas, syngas, biofuel, fuel oils, or any combination of liquid and gas fuels.

The turbine section 26 includes a plurality of turbine blades 48 (e.g., rotating blades) and a plurality of turbine vanes 50 (e.g., stationary vanes) disposed within a turbine casing 52 about a turbine shaft 54. Additionally, the turbine blades 48 and the turbine vanes 50 may be arranged in one or more turbine stages 56, such as between 1 and 10 or more turbine stages. The turbine blades 48 extend radially outward from the shaft 54 toward the turbine casing 52, while the turbine vanes 50 extend radially inward from the turbine casing 52 toward the shaft 54. In each of the turbine stages 56, a plurality of the turbine blades 48 are spaced circumferentially around and coupled to the shaft 54, and a plurality of the turbine vanes 50 are arranged circumferentially about the turbine casing 52. The turbine shaft 54 also connects to the load 28 via a shaft 58.

In operation, the gas turbine system 12 routes an air intake flow 60 from the air intake section 20 into the compressor section 22. The compressor section 22 progressively compresses the air intake flow 60 in the stages 30 and delivers a compressed airflow 62 into the one or more combustors 40. The one or more combustors 40 receive fuel from the fuel supply 46, route the fuel through the fuel nozzles 44, and combust the fuel with the compressed airflow 62 to generate hot combustion gasses in a combustion chamber 64 within the combustor 40. The one or more combustors 40 then route a hot combustion gas flow 66 into the turbine section 26. The turbine section 26 progressively expands the hot combustion gas flow 66 and drives rotation of the turbine blades 48 in the stages 56 before discharging an exhaust gas flow 68. As the hot combustion gas flow 66 drives rotation of the turbine blades 48, the turbine blades 48 drive rotation of the turbine shaft 54, the shafts 42 and 58, and the compressor shaft 38. Accordingly, the turbine section 26 drives rotation of the compressor section 22 and the load 28. The exhaust gas flow 68 may be partially or entirely directed to flow through the HRSG 14 to enable heat recovery and steam generation.

The HRSG 14 may include a plurality of modules or components 70 disposed along a flow path 72 within a duct 74 at one or more positions or stages 76. The components 70 may include various HRSG equipment configured to recover heat from the exhaust gas flow 68. For example, at each of the stages 76, the components 70 may include one or more heat exchangers 78. For example, in the illustrated embodiment, each of the stages 76 includes a plurality of heat exchange sections or heat exchangers 78, such as three heat exchangers 78. Additionally, the HRSG 14 may include the restraint system 18 in one or more of the stages 76. For example, in certain embodiments, the HRSG 14 may include the restraint system 18 only at the first stage 76, while some embodiments of the HRSG 14 may include the restraint system 18 in 2, 3, 4, 5, or more stages 76 (e.g., all of the stages). As discussed in further detail below, the restraint system 18 may include a stiffening system and/or vibration damping system 80 configured to help stiffen the restraint system 18 and to reduce vibration and detune the natural frequencies of the components 70 away from excitation load frequencies, thereby reducing the possibility of resonance in the components 70 of the HRSG 14.

The vibration damping system 80 of the restraint system 18 may include a cable and sleeve assembly 82 configured to enable adjustment of the stiffness of the restraint system 18, such that tuning is possible to reduce the possibility of any resonance in the HRSG 14. The cable and sleeve assembly 82 may extend across the duct 74 in a horizontal orientation, a vertical orientation, or an angular orientation (e.g., at an angle between horizontal and vertical orientations). The cable and sleeve assembly 82 may include one or more cables 84 disposed in each of one or more sleeves 86. Accordingly, each sleeve 86 with one or more cables 84 therein may extend across the duct 74 in the horizontal, vertical, or angular orientation. In embodiments having a plurality of sets of sleeves 86 with one or more cables 84 therein, 1, 2, 3, 4, 5, or more (e.g., part or all) of the plurality of sets of sleeves 86 and cables 84 may be disposed in the horizontal orientation, the vertical orientation, the angular orientation, or a combination thereof. In each orientation (e.g., horizontal, vertical, or angular), a plurality of the sets of sleeves 86 with one or more cables therein may be spaced apart from one another in different positions, such as a spaced parallel arrangement. In the present embodiment, all of the plurality of sets of sleeves 86 with one or more cables 84 are disposed in the horizontal orientation at one or more vertical heights or elevations, such as 2, 3, 4, 5, 6, 7, 8, 9, 10 or more vertical heights or elevations.

Additionally, the cable and sleeve assembly 82 may include one or more upstream cable and sleeve assemblies 88 and one or more downstream cable and sleeve assemblies 90 relative to a direction of the exhaust gas flow 68 along the flow path 72. For example, 1, 2, 3, 4, 5, or more upstream cable and sleeve assemblies 88 may include the sleeves 86 with cables 84 in the same or different orientations (e.g., horizontal, vertical, or angular orientations). By further example, 1, 2, 3, 4, 5, or more downstream cable and sleeve assemblies 90 may include the sleeves 86 with cables 84 in the same or different orientations (e.g., horizontal, vertical, or angular orientations). In embodiments with the same orientation, the sleeves 86 with cables 84 in the upstream and downstream cable and sleeve assemblies 88 and 90 may be parallel to one another. In embodiments with different orientations, the sleeves 86 with cables 84 in the upstream and downstream cable and sleeve assemblies 88 and 90 may be crosswise (e.g., perpendicular) to one another. However, as noted above in the present embodiment, all of the plurality of sets of sleeves 86 with one or more cables 84 are disposed in the horizontal orientation, and thus the sleeves 86 with cables 84 may be parallel to one another across the duct 74. Additionally, each of the upstream and downstream cable and sleeve assemblies 88 and 90 may include a plurality of sets of sleeves 86 with one or more cables 84 spaced apart from one another (e.g., uniformly or non-uniformly spaced) in the horizontal orientation at different vertical heights or elevations, such as 2, 3, 4, 5, 6, 7, 8, 9, 10, or more vertical heights or elevations.

In each of the cable and sleeve assemblies 82, one or more cables 84 extend through each sleeve 86 between opposite duct walls 92 and 94 of the duct 74. The sleeves 86 extend between and couple to the opposite duct walls 92 and 94, and the cables 84 extend outside of the opposite duct walls 92 and 94 and couple with a tension assembly 96. The opposite duct walls 92 and 94 may be opposite side walls connected to one another by opposite top and bottom walls, or the opposite duct walls 92 and 94 may be opposite top and bottom walls connected to one another by opposite side walls. In the illustrated embodiment, the opposite duct walls 92 and 94 may be opposite side walls, each illustrated sleeve 86 and cable 84 extends in the horizontal orientation, and each illustrated sleeve 86 and cable 84 represents a plurality of vertically spaced, parallel sets of the sleeves 86 and cables 84 across the duct 74 between the top and bottom walls.

The sleeves 86 (e.g., protective sleeves) are configured to protect the cables 84 from exposure to the exhaust gas flow 68 in the duct 74. For example, the sleeves 86 may provide thermal protection, wear resistance, erosion resistance, chemical resistance, or any combination thereof. In certain embodiments, the sleeves 86 may include a hollow annular body and/or a surface coating comprising a thermally insulative material, a wear resistant material, an erosion resistant material, a chemically resistant material, or any combination thereof. For example, the sleeves 86 may be constructed with a stainless steel material. The sleeves 86 may completely surround the cables 84 and seal with the duct 74, such that the exhaust gas flow 68 is substantially or completely blocked from entering the sleeves 86 and contacting the cables 84. The cables 84 may be constructed from the same or different materials than the sleeves 86. In certain embodiments, for example, the cables 84 may be constructed from a stainless steel material, which is the same as or different from the stainless steel material of the sleeves 86.

The dimensions of the sleeves 86 and the cables 84 may be selected to provide sufficient restraint for the components 70 of the HRSG 14. In certain embodiments, a diameter of the sleeves 86 is between approximately 2 to 10 centimeters, 4 to 6 centimeters, or about 5 centimeters. The diameter of the cables 84 may vary based on the number of cables 84 inside each sleeve 86 and the diameter of the sleeve 86. For example, each sleeve 86 may include 1, 2, 3, 4, 5, 6, 7, 8, 9, or 10 cables 84, wherein each cable 84 has a diameter of approximately 0.5 to 2 centimeters or 1.2 to 1.6 centimeters. In certain embodiments, each sleeve 86 may be approximately 5 centimeters in diameter, each sleeve 86 may include 3 or 4 cables 84, and each cable 84 may be approximately 1.2 to 1.6 centimeters in diameter. The cables 84 are flexible and respond to tension to vary a stiffness of the cables 84 and the sleeves 86 across the duct 74 at the upstream and downstream sides of the components 70.

The tension assembly 96 may include one or more tensioners 98 coupled to each of the one or more cables 84. The tensioners 98 are configured to adjust the tension in each of the cables 84, thereby allowing adjustment of the stiffness of the upstream and downstream cable and sleeve assemblies 82, which provide restraint against movement of the components 70 in each of the one or more stages 76. Accordingly, by increasing or decreasing tension via the tensioners 98, the stiffness of the restraint of the components 70 may be adjusted to detune the natural frequencies of the components 70 away from the excitation load frequencies caused by oscillations of the exhaust gas flow 68 through the duct 74. The tensioners 98 and/or the cables 84 may be coupled to a support structure 100 disposed on the outer surfaces of each of the duct walls 92 and 94. As discussed in further detail below, each of the tensioners 98 may include one or more spring tensioners, turnbuckles, fluid-driven tensioners, electric-driven tensioners, manual tensioners, counterweight tensioners, or any combination thereof.

The exhaust gas flow 68 flows through the duct 74 and transfers heat to one or more fluids in the components 70 (e.g., heat exchangers 78), which may be configured to generate steam for the steam turbine system 16. The components 70 of the HRSG 14 may include a low pressure (LP) section of the components 70, an intermediate pressure (IP) section of the components 70, and a high pressure (HP) section of the components 70. The components 70 (e.g., heat exchangers 78) may include economizers, evaporators, superheaters, or any combination thereof, in each of the LP, IP, and HP sections. For example, the heat exchangers 78 of the components 70 may include low pressure heat exchangers, high pressure heat exchangers, intermediate heat exchangers, or any combination thereof. The heat exchangers 78 may be coupled together via various conduits and headers, and the HRSG 14 may route one or more flows of steam 102 (e.g., low pressure steam, intermediate pressure steam, and high pressure steam) to a steam turbine 104 of the steam turbine system 16.

The steam turbine 104 may include a high pressure steam turbine (HP ST) 106, an intermediate pressure steam turbine (IP ST) 108, and a low pressure steam turbine (LP ST) 110, which are coupled together via shafts 112 and 114. Additionally, the steam turbine 104 may be coupled to a load 116 via a shaft 118. Similar to the load 28, the load 116 may include an electrical generator. The HRSG 14 may be configured to generate a high pressure steam for the high pressure steam turbine 106, an intermediate pressure steam for the intermediate pressure steam turbine 108, and a low pressure steam for the low pressure steam turbine 110. The steam turbine 104 may discharge a condensate 120 (or the steam may be condensed downstream from the steam turbine 104), such that the condensate 120 can be pumped back into the HRSG 14 via one or more pumps 122.

Again, as discussed in further detail below, the restraint system 18 is configured to restrain movement of the components 70, such as the heat exchangers 70, and to control vibration via the vibration damping system 80. The illustrated system 10 also includes a controller 124 configured to control operation of the gas turbine system 12, the HRSG 14, the steam turbine system 16, and one or more features of the vibration damping system 80. The controller 124 includes one or more processors 126, memory 128, and instructions 130 stored on the memory 128 and executable by the processor 126. For example, the instructions 130 may include gas turbine operating instructions, HRSG operating instructions, steam turbine operating instructions, and vibration damping instructions for the vibration damping system 80. The controller 124 also may receive feedback from a plurality of sensors 132, which are designated by an "S" in FIG. 1, and perform control actions (e.g., alerts, alarms, and/or adjustments of operating parameters) in response to the feedback. The sensors 132 may be communicatively coupled to the controller 124 via wires or wireless communication circuitry.

The sensors 132 may be disposed at one or more locations in the air intake section 20, the compressor section 22, the combustor section 24, the turbine section 26, the HRSG 14, and the steam turbine system 16. In particular, the sensors 132 may be disposed at various locations throughout the HRSG 14, such that vibration, oscillations in the exhaust gas flow 68, and other flow characteristics may be measured along the flow path 72. For example, the sensors 132 may include flow sensors, vibration sensors, pressure sensors, temperature sensors, fuel composition sensors, exhaust emissions sensors (e.g., nitrogen oxide sensors, carbon monoxide sensors, or carbon dioxide sensors), or any combination thereof. The flow sensors may measure the flow rate of the exhaust gas flow 68 and help identify oscillations in the flow rate. The vibration sensors may measure vibration in the duct 74, the components 70, the restraint system 18, or any combination thereof. The pressure sensors may measure the pressure of the exhaust gas flow 68 and help identify oscillations in the pressure. The temperature sensors may measure the temperature of the exhaust gas flow 68 and help identify oscillations in the temperature. The foregoing sensors 132 also may be used to measure similar oscillations in the compressor section 22, the combustor section 24, and the turbine section 26. The feedback from the sensors 132 may be used by the controller 124 in a variety of ways.

In certain embodiments, if the controller 124 observes undesirable sensor feedback within the HRSG 14 or at the components 70, then the controller 124 may provide an alarm or an alert to a user via an electronic display, change operation of the system 10, or make adjustments to the vibration damping system 80 depending on the type of tensioners 98 used within the restraint system 18. The undesirable sensor feedback may include any of the foregoing sensor feedback exceeding one or more thresholds, rising or falling at an excessive rate, meeting or approaching a level known to be associated with resonance, or any combination thereof. As a non-limiting example, the undesirable sensor feedback from the sensors 132 may include a vibration exceeding one or more vibration thresholds, wherein a first vibration threshold may trigger an alert (e.g., a visual alert on the electronic display), a second vibration threshold may trigger an alarm (e.g., an audible alarm through a speaker), a third vibration threshold may trigger a first control action (e.g., a first corrective action to help reduce the vibration), and a fourth vibration threshold may trigger a second control action (e.g., a second corrective action to help reduce the vibration).

The corrective actions may be automatic control actions by the controller 124 and/or controller 124 recommended adjustments that prompt user intervention. The corrective actions may include adjustments to the gas turbine system 12, such as changes in the fuel supply, changes in the fuel/air ratio, and/or changes in the exhaust gas flow 68. In certain applications, the corrective actions may include shutting down the gas turbine system 12 and/or diverting the exhaust gas flow 68 away from the HRSG 14. The corrective actions also may include adjustments to the vibration damping system 80 (e.g., tensioners 98). For example, if the vibration damping system 80 includes tensioners 98 having electronic control features, then the controller 124 may automatically adjust the tensioners 98 to change the tension in the cables 84 and thus change the stiffness of the restraint system 18. In this manner, the adjusted tension in the cables 84 and stiffness in the restraint system 18 can detune the natural frequencies of the components 70 (e.g., heat exchangers 78) away from the excitation load frequencies in the components 70, thereby helping to reduce the possibility of resonance in the components 70. In certain embodiments, one or more of the tensioners 98 may be adjusted manually by a technician, rather than automatically by the controller 124, and thus the corrective actions prompt user intervention. Additionally, one or more of the tensioners 98 may not be adjustable; however, the non-adjustable tensioners 98 may be used in combination with one or more adjustable tensioners 98. Examples and characteristics of the tensioners 98 are described in further detail below.

Figure 2:
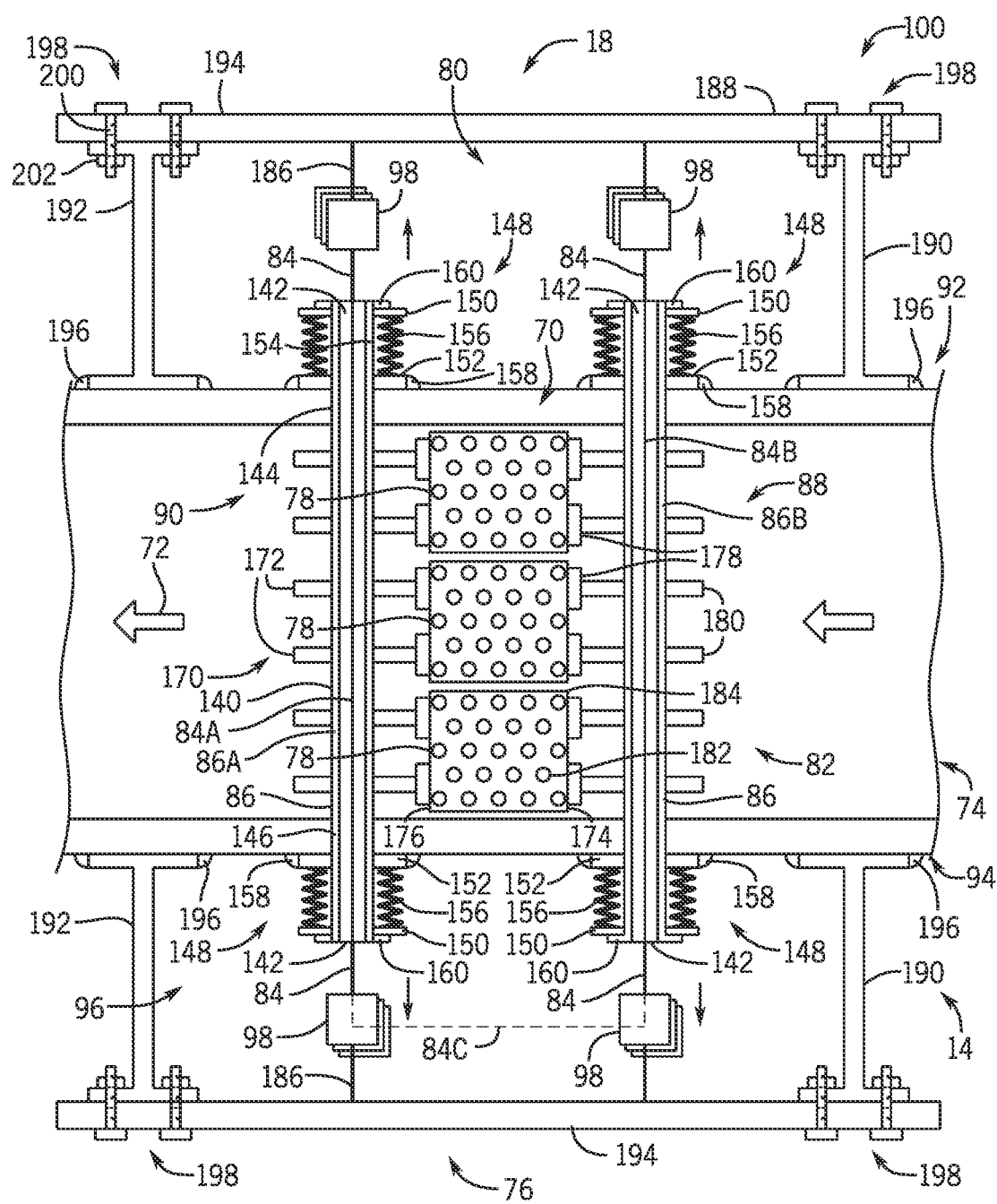
FIG. 2 is a partial schematic view of an embodiment of the HRSG of FIG. 1, illustrating the restraint system having a vibration damping system.

FIG. 2 is a partial schematic view of an embodiment of the HRSG 14 of FIG. 1, illustrating the restraint system 18 having the vibration damping system 80 at one of the stages 76 of the HRSG 14. The vibration damping system 80 includes the cable and sleeve assembly 82 coupled to the tension assembly 96, which facilitates adjustment of the tension in each cable 84 in a respective sleeve 86 in both the upstream and downstream cable and sleeve assemblies 88 and 90. The cable and sleeve assemblies 82 are illustrated with only one sleeve 86 and corresponding cable 84 at each of the upstream and downstream cable and sleeve assemblies 88 and 90. However, each of the upstream and downstream cable and sleeve assemblies 88 and 90 may include a plurality of sleeves 86 (e.g., 2, 3, 4, 5, 6, 7, 8, 9, 10, or more sleeves) having one or more corresponding cables 84 (e.g., 1, 2, 3, 4, 5, 6, or more cables per sleeve) coupled to tensioners 98 to facilitate retention and vibration damping of the heat exchangers 78 of the components 70.

In certain embodiments, one or more cables 84 may include a common cable 84 (e.g., a single cable or a plurality of cables in a bundle) extending sequentially through a plurality of sleeves 86 in series, such that the common cable 84 has a first cable or cable portion 84A disposed in a first sleeve 86A and a second cable or cable portion 84B disposed in a second sleeve 86B, wherein the common cable 84 extends a distance between the sleeves 86A and 86B via an intermediate cable or cable portion 86C outside of the sleeves 86A and 86B. The cables or cable portions 84A, 84B, and 84C may be integrally formed as a single continuous cable or the cables or cable portions 84A, 84B, and 84C may be fixedly or removably connected together via joints, such as welded joints, hooks, removable fasteners, or any combination thereof. The common cable 84 may extend between the sleeves 86A and 86B via a sleeve, a channel, a conduit, a plurality of cable hooks, a plurality of cable loops, or any combination thereof. In certain embodiments, the common cable 84 may extend through and/or couple to the tensioners 98 for associated with the different sleeves 86, e.g., sleeves 86A and 86B. Additionally, in certain embodiments, the common cable 84 may be coupled to a single shared tensioner 98 at one or both sides of the duct 74.

In the illustrated embodiment, each of the sleeves 86 of the cable and sleeve assemblies 82 includes a central sleeve portion 140 disposed between opposite end sleeve portions 142. The central sleeve portion 140 is disposed within the flow path 72 inside the duct 74 between the opposite duct walls 92 and 94, such that the central sleeve portion 140 is exposed to the exhaust gas flow 68 along the flow path 72. The end sleeve portions 142 extend through and seal with the opposite duct walls 92 and 94. The end sleeve portions 142 may protrude outwardly from the opposite duct walls 92 and 94, or the end sleeve portions 142 may terminate and seal flush with the opposite duct walls 92 and 94. For example, the end sleeve portions 142 are disposed in bores 144 and 146 in the respective duct walls 92 and 94. The end sleeve portions 142 extend outward away from the duct walls 92 and 94 and couple to expansion bellows 148 (e.g., annular expansion bellows).

Each expansion bellows 148 includes an annular body 150 disposed about the end sleeve portion 142 at each of the duct walls 92 and 94, and an annular flange or lip 152 extending radially outward from the annular body 150 of the expansion bellows 148. The expansion bellows 148 also includes a bore 154 disposed about the end sleeve portion 142 of the sleeve 86. The annular body 150 has a bellows wall 156 having a diameter that increases and decreases in an alternating manner between first and second diameters, wherein the first diameter is larger than the second diameter. For example, the bellows wall 156 has a plurality of annular wall sections that are angled between the first and second diameters, such that the plurality of annular wall sections can expand and contract in an axial direction along a central axis of the expansion bellows 148. The expansion bellows 148 is configured to enable expansion and contraction (e.g., thermal expansion and contraction) of the sleeve 86 during operation of the HRSG 14 while maintaining a seal of the sleeve 86 with the opposite duct walls 92 and 94 of the duct 74.

The annular lip 152 of the expansion bellows 148 may be coupled to the outer surface of each of the duct walls 92 and 94 via a fastener or joint 158 (e.g., a brazed joint and/or a welded joint), which is configured to fix and seal the expansion bellows 148 to the duct 74. In some embodiments, the annular lip 152 of the expansion bellows 148 may be coupled to the duct walls 92 and 94 with one or more removable fasteners (e.g., threaded fasteners or bolts), threaded connections, clamps, or other removable or fixed fasteners. The expansion bellows 148 also may include one or more seals (e.g., annular seals) between the annular lip 152 and the duct 74 and/or between the annular body 150 and the end sleeve portion 142.

The end sleeve portion 142 may be coupled to the expansion bellows 148 via a retainer 160. In certain embodiments, the retainer 160 may be a brazed joint and/or a welded joint, which is configured to fix and seal the end sleeve portion 142 to the expansion bellows 148. In some embodiments, the retainer 160 may include an annular clip (e.g., a C-clip) disposed in an annular slot on the end sleeve portion 142, an annular nut threaded onto a threaded annular portion of the end sleeve portion 142, an annular flange (e.g., welded to the end sleeve portion 142 and bolted to the expansion bellows 148), or another removable or fixed retainer. Accordingly, the sleeve 86 of each of the upstream and downstream cable and sleeve assemblies 88 and 90 is coupled to both the duct wall 92 and the duct wall 94 via the expansion bellows 148 at the end sleeve portions 142 of the sleeve 86.

During operation, the expansion bellows 148 are configured to enable expansion and contraction of the sleeves 86 while also sealing the expansion bellows 148 to the opposite duct walls 92 and 94, thereby blocking entry of the exhaust gas flow 68 within the flow path 72 into the sleeves 86 or outside of the duct 74. Thus, the expansion bellows 148 help to protect the cables 84 disposed inside of the sleeves 86 and immediately outside of the duct 74.

The components 70, which include one or more heat exchangers 78, are retained between the upstream and downstream cable and sleeve assemblies 88 and 90 of the vibration damping system 80 of the restraint system 18. As illustrated, the restraint system 18 includes a bumper assembly 170 having a plurality of bumpers 172 coupled to each of the sleeves 86 and contacting upstream and downstream sides 174 and 176 of the heat exchangers 78. Each of the bumpers 172 includes a bumper head 178 coupled to a support bracket or arm 180. The bumper head 178 is configured to contact the heat exchanger 78 at the upstream side 174 or the downstream side 176. The support bracket or arm 180 is coupled to the sleeve 86 in the upstream or downstream cable and sleeve assembly 88 and 90 via one or more fasteners as discussed below. In the illustrated embodiment, each of the heat exchangers 78 of the component 70 may include one or more of the bumpers 172 at both the upstream side 174 and the downstream side 176 of the respective heat exchanger 78.

Additionally, each of the heat exchangers 78 may include one or more tubes 182 supported by a heat exchanger body or framework 184, which is configured to help hold together the one or more tubes 182. The tubes 182 are configured to circulate a fluid (e.g., water) configured to be heated by the exhaust gas flow 68 along the flow path 72 in the duct 74. The bumpers 172 may be configured to contact the one or more tubes 182, the body or framework 184, or a combination thereof. As discussed in further detail below, the tension assembly 96 is configured to adjust the tension in the one or more cables 84 in each of the one or more sleeves 86, thereby adjusting the stiffness of the cable and cable assemblies 82 while the bumpers 172 contact the heat exchangers 78 to detune the natural frequencies of the heat exchangers 78 away from the excitation load frequencies (e.g., frequencies of loads on the heat exchangers 78 due to the frequencies of oscillations in the exhaust gas flow 68).

The cable and sleeve assembly 82 has one or more cables 84 extending through each sleeve 86 in the upstream and downstream cable and sleeve assemblies 88 and 90. The cables 84 are coupled to one or more tensioners 98 of the tension assembly 96. In the illustrated embodiment, each cable 84 is coupled to one or more tensioners 98 on opposite sides of the duct 74 at the opposite duct walls 92 and 94. The tensioners 98 are coupled to the support structure 100 via a mount 186. In certain embodiments, the mount 186 may include a mounting arm, a bracket, a cable, a flange, or any combination thereof. In some embodiments, the tension assembly 96 may include one or more tensioners 98 disposed at only one side of the duct 74, such as only at the duct wall 92 for all or part of the sleeves 86, only at the duct wall 94 for all or part of the sleeves 86, or only one side of the duct 74 for each of the sleeves 86. However, in the illustrated embodiment, the tensioners 98 are disposed on both sides of the duct 74 for each of the sleeves 86 at both the upstream and downstream cable and sleeve assemblies 88 and 90.

As discussed in further detail below, the illustrated tensioners 98 may include one or more types of tensioners being used alone or in combination with one another to adjust the tension in each of the cables 84. By adjusting the tension in the cables 84 at the upstream and downstream cable and sleeve assemblies 88 and 90, the stiffness of the restraint system 18 can be increased or decreased, thereby helping to detune the natural frequencies of the heat exchangers 78 away from the excitation load frequencies within the HRSG 14.

The support structure 100 includes a U-shaped body 188 disposed at each of the duct walls 92 and 94 and extending from the outer surface of the respective duct walls 92 and 94. The U-shaped body 188 includes extension arms or beams 190 and 192 disposed respectively upstream and downstream of the stage 76, and a mounting support or plate 194 coupling together the extension arms or beams 190 and 192. The extension arms or beams 190 and 192 may have an I-shaped structure or H-shaped structure or some other configuration to support the mounting support or plate 194 at each of the duct walls 92 and 94. The extension arms or beams 190 and 192 are coupled to each of the duct walls 92 and 94 via one or more joints 196, such as welded joints and/or brazed joints. In some embodiments, the extension arms or beams 190 and 192 may be coupled to each of the duct walls 92 and 94 via the joints 196 (e.g., welded and/or brazed joints), a clamp, a hinged joint, one or more removable fasteners (e.g., threaded fasteners or bolts), one or more fixed fasteners, or any combination thereof. Similarly, the mounting support or plate 194 may be coupled to each of the extension arms or beams 190 and 192 via one or more fasteners or joints 198. In the illustrated embodiment, each of the fasteners or joints 198 includes a male threaded fastener 200 and a female threaded fastener 202. The male threaded fastener 200 extends through the mounting support or plate 194 and the extension arm or beam 190 and 192 and connects with (is secured by) the female threaded fastener 202. Additionally, or alternatively, the mounting support or plate 194 may be coupled to each of the extension arms or beams 190 and 192 by one or more other fasteners or joints, such as a welded joint, a brazed joint, a hinge, a clamp, or one or more other fixed or removable fasteners.

FIG. 3 is a cross-sectional view of one of the bumpers 172 coupled to one of the sleeves 86 of the restraint system 18 of FIGS. 1 and 2. As illustrated, the bumper 172 is coupled to the sleeve 86 via an annular bracket 210 having opposite C-shaped portions 212 and 214 coupled together at lips 216 and 218. In particular, the C-shaped portions 212 and 214 are contoured to fit about an annular exterior 220 of the sleeve 86, while the lips 216 and 218 are coupled together by one or more fasteners 222 (e.g., a threaded male fastener 224 coupled to a threaded female fastener 226). The threaded male fasteners 224 (e.g., bolt) extends through the lips 216 and 218 and threadedly couples with the female threaded fastener 226 (e.g., nut). The threaded fasteners 224 and 226 are configured to compress together the lips 216 and 218, thereby compressing together the C-shaped portions 212 and 214 about the annular exterior 220 of the sleeve 86. In some embodiments, the annular bracket 210 may be fixedly coupled to the annular exterior 220 of the sleeve 86 via a welded joint or a brazed joint. The bumper 172 also has the support bracket or arm 180 extending away from the annular bracket 210 and the sleeve 86 toward the bumper head 178, which is configured to contact the heat exchanger 78 of the component 70. In certain embodiments, the bumper head 178 may include one or more bumper layers or plates 228, which may include a different material and/or a protective material configured to help protect the heat exchangers 78.

As illustrated in FIG. 3, the cable 84 in the illustrated sleeve 86 may include a plurality of individual cables or cable sections 230. The individual cables 230 may be twisted together to define the cable 84, the cables 230 may be completely independent from one another, or one or more materials may help bond the cables 230 together to define the cable 84. As the cable 84, including the cables or cable sections 230, extends through the sleeve 86 within the flow path 72 of the duct 74, the sleeve 86 is configured to protect the cable 84 from the exhaust gas flow 68 within the duct 74. For example, the sleeve 86 may be configured to provide thermal protection, vibration protection, chemical protection, or any combination thereof. Accordingly, the sleeve 86 may include a material resistant to heat, corrosion, erosion, or any combination thereof. In certain embodiments, the sleeve 86 may be constructed of a stainless steel material.

As discussed above, the tensioners 98 of the tension assembly 96 may include one or more types of tensioners being used alone or in combination with one another to adjust a tension of each cable 84 in the cable and sleeve assembly 82. Examples of these tensioners 98 are discussed below with reference to FIGS. 4-9. The representation of the tensioners 98 in FIGS. 1 and 2 is intended to include any one or more of the tensioners 98 of FIGS. 4-9 in combination with one another, wherein the tensioners 98 may be used in series arrangements, parallel arrangements, or a combination thereof.

FIG. 4 is a schematic of an embodiment of the tensioner 98, illustrating a spring tensioner 240 having a helical spring section 242 extending between opposite connectors 244 and 246. In the illustrated embodiment, each of the connectors 244 and 246 includes a ring or loop at opposite terminal ends of the spring tensioner 240. For example, the connector 244 may be configured to couple to the cable 84 or another tensioner 98, the connector 246 may be configured to couple to the mount 186 or another tensioner 98, or any combination thereof. In certain embodiments, the tensioner 98 of FIG. 4 may include a plurality of the spring tensioners 240 disposed in parallel, in series, or a combination thereof. Additionally, one or more of the spring tensioners 240 may be used in combination with one or more of the tensioners 98 of FIGS. 5-9.

FIG. 5 is a schematic of an embodiment of the tensioner 98 including a turnbuckle 250. The illustrated turnbuckle 250 includes a body 252 having threaded bores 254 and 256, an eye bolt 258 having a connector 260 coupled to a threaded shaft 262, and an eye bolt 264 having a connector 266 coupled to a threaded shaft 268. Each of the eye bolts 258 and 264 is configured to thread into the body 252 at the threaded bores 254 and 256, respectively. In particular, the threaded shaft 262 threadedly engages with the threaded bore 254, while the threaded shaft 268 threadedly engages with the threaded bore 256. The threads of the threaded shaft 262 of the eye bolt 258 are opposite from the threads of the threaded shaft 268 of the eye bolt 264. For example, the eye bolts 258 and 264 may have opposite handedness in the threads, such as a right-hand thread and a left-hand thread. The connector 266 may be configured to couple with the cable 84, another one of the tensioners 98 such as the spring tensioner 240, or any combination thereof. Similarly, the connector 260 may be configured to couple to the mount 186, another one of the tensioners 98, or any combination thereof. Additionally, one or more of the turnbuckles 250 may be used in combination with one or more of the tensioners 98 of FIGS. 4 and 6-9.

Figure 6:
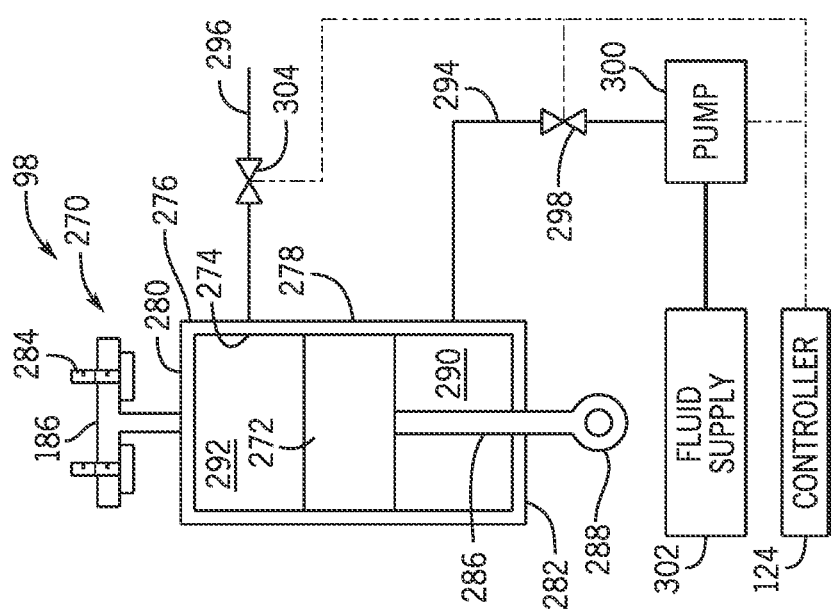
FIG. 6 is a schematic of an embodiment of a tensioner of the restraint system of FIGS. 1-3, illustrating a fluid-driven tensioner.

FIG. 6 is a schematic of an embodiment of the tensioner 98 including a fluid driven tensioner 270 configured to be used alone or in combination with one or more of the other tensioners described in FIGS. 4, 5, and 7-9. In the illustrated embodiment, the fluid driven tensioner 270 includes a piston 272 disposed within a cylinder 274 of a body 276. The body 276 may include a generally annular body having an annular side wall 278 and opposite end walls 280 and 282. The end wall 280 may be coupled to the mount 186, which may be fastened to the mounting support or plate 194 of FIG. 2 via one or more threaded fasteners 284, such as threaded bolts. The piston 272 is coupled to a shaft 286 having a connector 288 disposed outside of the body 276. The shaft 286 is generally sealed in the end wall 282 of the body 276, such as with one or more annular bushings or seals. The connector 288 may include a connector ring or loop, which may be connected to the cable 84, one or more of the other tensioners 98 described herein with reference to FIGS. 4, 5, and 7-9, or any combination thereof.

The piston 272 is disposed in the cylinder 274 between opposite chambers 290 and 292. The chamber 290 is coupled to a supply conduit 294, while the chamber 292 is coupled to a discharge conduit 296. The supply conduit 294 is coupled to a valve 298, a pump 300, and a fluid supply 302. The fluid supply 302 is configured to supply a fluid, such as a liquid or gas, to the pump 300. The pump 300 is configured to pump the fluid through the supply conduit 294 into the chamber 290 to bias movement of the piston 272. The valve 298 is configured to open when supplying the fluid to the chamber 290, and the valve 298 is configured to close to hold fluid pressure in the chamber 290 and hold a position of the piston 272. As the fluid supply 302 supplies the fluid to move the piston 272, the shaft 286 adjusts tension in the cable 84 of the cable and sleeve assembly 82. The discharge conduit 296 includes a valve 304 configured to open and close to release or hold pressure within the chamber 292. For example, when the piston 272 is driven by fluid pressure in the chamber 290, the discharge conduit 296 may release pressure from the chamber 292 by opening the valve 304. In the illustrated embodiment, the controller 124 may be communicatively coupled to the pump 300 and the valves 298 and 304 to control operation of the piston 272, thereby adjusting the tension applied by the shaft 286 to the cable 84. Again, the fluid driven tensioner 270 may be used alone or in combination with the other tensioners 98 of FIGS. 4, 5, and 7-9.

Figure 7:
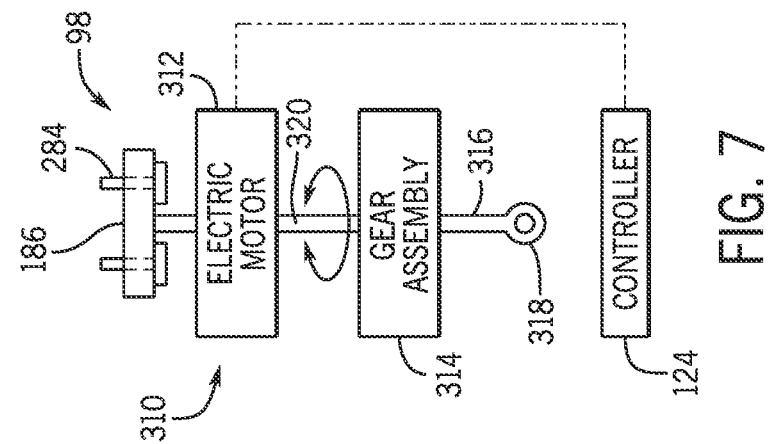
FIG. 7 is a schematic of an embodiment of a tensioner of the restraint system of FIGS. 1-3, illustrating an electric-driven tensioner.

FIG. 7 is a schematic embodiment of the tensioner 98 including an electric driven tensioner 310. In the illustrated embodiment, the electric driven tensioner 310 incudes one or more electric motors 312 (e.g., AC motors and/or DC motors), one or more gear assemblies 314, and a shaft 316 having a connector 318. The electric motor 312 may be communicatively coupled to the controller 124, which may be configured to control at least one or more of the rotational direction, speed, or torque of the electric motor 312. The electric motor 312 may be configured to rotate a shaft 320 coupled to the gear assembly 314, and the gear assembly 314 may be configured to convert the rotational motion of the shaft 320 into a linear motion of the shaft 316. The shaft 316 moves the connector 318, which may be coupled to the cable 84, one or more of the tensioners 98, or any combination thereof. Additionally, the electric motor 312 may be coupled to the mounting support or plate 194 of FIG. 2 via the mount 186 and fasteners 284 as discussed above with reference to FIG. 6. In certain embodiments, the electric driven tensioner 310 may be used with one or more of the tensioners 98 of FIGS. 4-6, 8, and 9.

Figure 8:
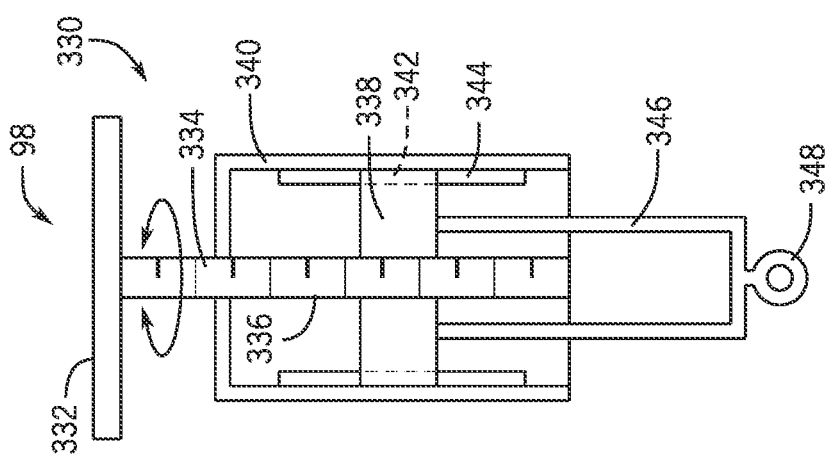
FIG. 8 is a schematic of an embodiment of a tensioner of the restraint system of FIGS. 1-3, illustrating a manual tensioner having a rotatable hand wheel.

FIG. 8 is a schematic embodiment of the tensioner 98 including a manual tensioner 330. In the illustrated embodiment, the manual tensioner 330 includes a rotatable hand wheel 332 coupled to a shaft 334 having a threaded shaft portion 336, which engages with a threaded nut 338. The threaded shaft portion 336 and the threaded nut 338 are disposed within a body 340, such as an annular body extending along the threaded shaft portion 336. The threaded nut 338 may be inhibited from rotation via an axial slot 342 that engages an axial anti-rotation protrusion 344 disposed along an interior of the body 340. Accordingly, as the wheel 332 is rotated to cause rotation of the threaded shaft portion 336, the threaded nut 338 moves axially along the anti-rotation protrusion 344, thereby causing linear movement of a linking arm 346 coupled to the threaded nut 338. The linking arm 346 further includes a connector 348, such as a loop or ring, which may be coupled to the cable 84, one or more additional tensioners 98, or any combination thereof. In certain embodiments, the manual tensioner 330 may be used with one or more of the tensioners 98 of FIGS. 4-7 and 9.

Figure 9:
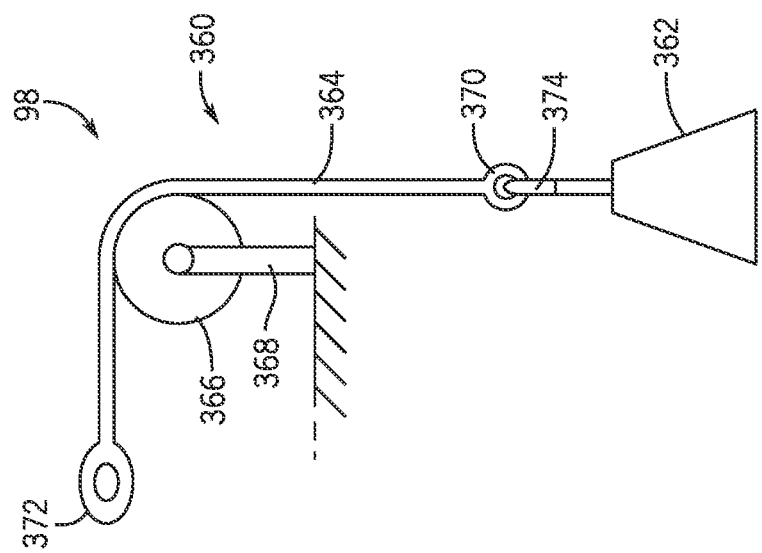
FIG. 9 is a schematic of an embodiment of a tensioner of the restraint system of FIGS. 1-3, illustrating a counterweight tensioner.

FIG. 9 is a schematic embodiment of the tensioner 98 including a counter-weight tensioner 360. As illustrated, the counter-weight tensioner 360 includes a counter-weight 362 coupled to a cable 364, which moves along a pulley 366. The pulley 366 may be mounted to the mounting support or plate 194, one of the duct walls 92 or 94, or another structure via a mounting arm 368. The cable 364 may include opposite connectors 370 and 372. The connector 370 may include a loop or ring, which is coupled to a corresponding fastener or hook 374 of the counter-weight 362. The connector 372 may include a loop or ring, which is configured to couple to the cable 84, one or more additional tensioners 98, or any combination thereof. Accordingly, the counter-weight 362 may be sized to provide a sufficient amount of tension in the cable 364 and the cable 84 of the restraint system 18 with or without additional tensioners 98. In certain embodiments, the counter-weight tensioner 360 may be used with one or more of the tensioners 98 of FIGS. 4-8.

The tensioners 98 illustrated in FIGS. 4-9 are intended to be used alone or in any combination with one another as the one or more tensioners 98 of FIGS. 1 and 2. For example, in certain embodiments, one or more of the spring tensioners 240 of FIG. 4 may be used in combination with one or more of the turnbuckles 250 of FIG. 5. Additionally, the spring tensioner 240 may be used in combination with one or more of the fluid tensioners 270 of FIG. 6, the electric-driven tensioners 310 of FIG. 7, the manual tensioners 330 of FIG. 8, the counter-weight tensioners 360 of FIG. 9, or any combination thereof. The illustrated tensioners 98 of FIGS. 4-9 may be used in various series arrangements, parallel arrangements, or any combination thereof. Accordingly, for each of the tensioners 98 on each side of the duct 74 at both of the upstream and downstream cable and sleeve assemblies 88 and 90 as illustrated in FIGS. 1 and 2, the tensioners 98 of FIGS. 4-9 may be used alone or in combination with one another to adjust the tension in each of the cables 84.

Technical effects of the disclosed embodiments include a restraint system 18 having a vibration damping system 80 with a tension assembly 96 and a cable and sleeve assembly 82 configured to provide stiffness when holding components 70 (e.g., heat exchangers 78) in place along a flow path 72. The cable and sleeve assembly 82 includes sleeves 86 that protect cables 84 from the exhaust gas flow 68 along the flow path 72, while a tension in the cables 84 is adjustable via tensioners 98 of the tension assembly 96 to change the stiffness in the cable and sleeves assembly 82. The vibration damping system 80 also includes a bumper assembly 170 having a plurality of bumpers 172 coupled to the sleeves 86 and making contact with upstream and downstream sides of the components 70. In operation, the tensioners 98 are configured to adjust the tension in the cables 84 to change the stiffness and detune the natural frequencies of the components 70 away from the excitation load frequencies in the HRSG 14. The cable and sleeve assemblies 82 are substantially lighter than rigid restraints and provide flexibility to help reduce the possibility of resonance in the components 70.

The subject matter described in detail above may be defined by one or more clauses, as set forth below.

A system includes a retention system configured to support a heat exchanger along a flow path within a duct. The retention system includes a first sleeve configured to extend between opposite first and second walls of the duct, a first cable extending through the first sleeve, and a first bumper coupled to the first sleeve. The first bumper is configured to contact the heat exchanger. The retention system includes a first tensioner coupled to the first cable, wherein the first tensioner is configured to provide a first tension in the first cable.

The system of the preceding clause, wherein the first tensioner is configured to provide the first tension in the first cable to adjust a stiffness of the retention system and to adjust a natural frequency of the heat exchanger away from an excitation load frequency.

The system of any preceding clause, wherein the retention system includes a second sleeve configured to extend between the opposite first and second walls of the duct, a second cable extending through the second sleeve, and a second bumper coupled to the second sleeve. The second bumper is configured to contact the heat exchanger.

The system of any preceding clause, wherein the first and second bumpers are configured to contact upstream and downstream sides of the heat exchanger, respectively.

The system of any preceding clause, including a common cable having the first cable extending to the second cable in series, wherein the common cable extends between the first and second sleeves outside of the first and second sleeves.

The system of any preceding clause, including a second tensioner coupled to the second cable, wherein the second tensioner is configured to provide a second tension in the second cable.

The system of any preceding clause, wherein each of the first and second tensioners includes a plurality of tensioners.

The system of any preceding clause, wherein the plurality of tensioners include a spring and a turnbuckle.

The system of any preceding clause, wherein the first tensioner includes at least one of a spring, a turnbuckle, a fluid-driven tensioner, an electric-driven tensioner, a manual tensioner, or a counter-weight tensioner.

The system of any preceding clause, wherein the first tensioner includes at least two, three, four, five, or all of the spring, the turnbuckle, the fluid-driven tensioner, the electric-driven tensioner, the manual tensioner, or the counter-weight tensioner.

The system of any preceding clause, wherein the first tensioner includes a spring and a turnbuckle.

The system of any preceding clause, including a controller coupled to the first tensioner, wherein the controller is configured to control the first tension provided by the first tensioner in response to feedback from one or more sensors.

The system of any preceding clause, including the heat exchanger disposed in the duct, wherein the retention system is coupled to the duct to support the heat exchanger.

The system of any preceding clause, including a heat recovery steam generator (HRSG) having the heat exchanger disposed in the duct.

The system of any preceding clause, including a gas turbine engine configured to supply an exhaust gas flow through the HRSG.

A method includes supporting a heat exchanger along a flow path within a duct via a retention system. The retention system includes a first sleeve configured to extend between opposite first and second walls of the duct, a first cable extending through the first sleeve, and a first bumper coupled to the first sleeve. The first bumper is configured to contact the heat exchanger. The method includes providing a first tension in the first cable via a first tensioner coupled to the first cable.

The method of the preceding clause, wherein providing the first tension in the first cable includes providing control, via a controller, of a stiffness of the retention system to adjust a natural frequency of the heat exchanger away from an excitation load frequency.

The method of any preceding clause, wherein the retention system includes a second sleeve configured to extend between the opposite first and second walls of the duct, a second cable extending through the second sleeve, and a second bumper coupled to the second sleeve. The second bumper is configured to contact the heat exchanger, and the first and second bumpers are configured to contact upstream and downstream sides of the heat exchanger, respectively.

The method of any preceding clause, wherein the first tensioner includes a spring and a turnbuckle.

A heat recovery steam generator includes a heat exchanger disposed within a duct; and a retention system configured to support the heat exchanger along a flow path within the duct. The retention system includes first and second sleeves configured to extend between opposite first and second walls of the duct, first and second cables extending through the first and second sleeves, respectively, and first and second bumpers coupled to the first and second sleeves, respectively. The first bumper is configured to contact an upstream side of the heat exchanger, and the second bumper is configured to contact a downstream side of the heat exchanger. The system includes a tension system coupled to the first and second cables, wherein the tension system comprises a plurality of tensioners configured to provide a first tension in the first cable and a second tension in the second cable. The first and second tensions are configured to adjust a stiffness of the retention system and to adjust a natural frequency of the heat exchanger away from an excitation load frequency.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The invention claimed is:

1. A system, comprising:
   a retention system configured to support a heat exchanger along a flow path within a duct, wherein the retention system comprises:
   a first cable extending through a first wall and a second wall of the duct;
   a first tensioner coupled to the first cable outside of the first wall of the duct, wherein the first tensioner is configured to provide a first tension in the first cable; and
   a second tensioner coupled to the first cable outside of the second wall of the duct.

2. The system of claim 1, wherein the first tensioner is configured to provide the first tension in the first cable to adjust a stiffness of the retention system and to adjust a natural frequency of the heat exchanger away from an excitation load frequency.

3. The system of claim 1, wherein the first tensioner comprises at least one of a spring, a turnbuckle, a fluid-driven tensioner, an electric-driven tensioner, a manual tensioner, or a counter-weight tensioner.

4. The system of claim 1, wherein the retention system comprises a first sleeve disposed about the first cable.

5. The system of claim 1, wherein the retention system comprises a first bellows disposed about the first cable.

6. The system of claim 1, wherein the retention system comprises a first bumper configured to contact the heat exchanger.

7. The system of claim 1, wherein the retention system comprises a second cable extending through the duct.

8. The system of claim 7, comprising a common cable having the first cable extending to the second cable in series.

9. The system of claim 7, wherein the first cable is upstream from the heat exchanger and the second cable is downstream from the heat exchanger.

10. The system of claim 1, comprising a controller coupled to the first tensioner, wherein the controller is configured to control the first tension provided by the first tensioner in response to feedback from one or more sensors.

11. The system of claim 1, comprising the heat exchanger disposed in the duct, wherein the retention system is coupled to the duct to support the heat exchanger.

12. The system of claim 11, comprising a heat recovery steam generator (HRSG) having the heat exchanger disposed in the duct, a gas turbine engine configured to supply an exhaust gas flow through the HRSG, or a combination thereof.

13. A method, comprising:
    supporting a heat exchanger along a flow path within a duct via a first cable of a retention system, wherein the first cable extends through a first wall and a second wall of the duct;
    providing a first tension in the first cable via a first tensioner coupled to the first cable outside of the first wall of the duct; and
    wherein the first cable is coupled to a second tensioner outside of the second wall of the duct.

14. The method of claim 13, wherein providing the first tension in the first cable comprises providing control, via a controller, of a stiffness of the retention system to adjust a natural frequency of the heat exchanger away from an excitation load frequency.

15. The method of claim 13, wherein the heat exchanger comprises a heat recovery steam generator (HRSG).

16. A heat recovery steam generator, comprising:
    a heat exchanger disposed within a duct; and
    a retention system configured to support the heat exchanger along a flow path within the duct, wherein the retention system comprises:
    a plurality of cables extending through the duct, wherein at least one of the plurality of cables extends through a first wall of the duct and a second wall of the duct; and
    a tension system coupled to the at least one of the plurality of cables, wherein the tension system comprises a first tensioner disposed outside of the first wall of the duct and a second tensioner disposed outside of the second wall of the duct, the first tensioner being configured to adjust a tension in the at least one of the plurality of cables.

17. The heat recovery steam generator of claim 16, wherein the plurality of cables are sequential cable portions of a common cable disposed upstream, downstream, or a combination thereof, relative to the heat exchanger.

\* \* \* \* \*